US011519154B2

(12) United States Patent
Rosenpek et al.

(10) Patent No.: US 11,519,154 B2
(45) Date of Patent: Dec. 6, 2022

(54) ARTICULATED WORKING MACHINE

(71) Applicant: Volvo Construction Equipment AB, Eskilstuna (SE)

(72) Inventors: Norbert Rosenpek, Växjö (SE); Tore Oscarsson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 399 days.

(21) Appl. No.: 16/621,291

(22) PCT Filed: Jun. 12, 2017

(86) PCT No.: PCT/EP2017/064308
§ 371 (c)(1),
(2) Date: Dec. 11, 2019

(87) PCT Pub. No.: WO2018/228665
PCT Pub. Date: Dec. 20, 2018

(65) Prior Publication Data
US 2020/0109536 A1    Apr. 9, 2020

(51) Int. Cl.
*E02F 9/08* (2006.01)
*B60K 17/356* (2006.01)
*B62D 53/02* (2006.01)

(52) U.S. Cl.
CPC .......... *E02F 9/0841* (2013.01); *B60K 17/356* (2013.01); *B62D 53/026* (2013.01)

(58) Field of Classification Search
CPC .... E02F 9/0841; B60K 17/356; B62D 53/026
(Continued)

(56) References Cited

U.S. PATENT DOCUMENTS 3,910,369 A    10/1975  Chichester et al.
4,662,472 A *  5/1987   Christianson .......... B60K 25/06
                                                   180/69.6
(Continued)

FOREIGN PATENT DOCUMENTS

CN      101511639 A    8/2009
DE       3800930 A1    8/1989
(Continued)

OTHER PUBLICATIONS

International Search Report and Written Opinion of the International Searching Authority, PCT/EP2017/064308, dated Feb. 8, 2018, 11 pages.
(Continued)

*Primary Examiner* — Tony H Winner
(74) *Attorney, Agent, or Firm* — Sage Patent Group

(57) ABSTRACT

A working machine includes a first section with a first frame and at least one oscillation axle holding a first pair of ground engaging members; a second section with a second frame and a second pair of ground engaging members; a joint arrangement pivotly connecting the first frame to the second frame; a motor configured for driving one ground engaging member of the first pair of ground engaging members in order to create propulsion forces; a propulsion force transfer arrangement adapted to transfer propulsion forces from the ground engaging member of the first pair of ground engaging members to the second pair of ground engaging members, via the joint arrangement. The propulsion force transfer arrangement includes a connecting element extending centrally in a longitudinal direction of the working machine.

15 Claims, 4 Drawing Sheets

(58) Field of Classification Search
USPC .................................................. 180/414, 235
See application file for complete search history.

(56) References Cited

U.S. PATENT DOCUMENTS

| | | | |
|---|---|---|---|
| 5,273,317 | A | 12/1993 | Kunz et al. |
| 8,172,248 | B2 | 5/2012 | Groves |
| 9,464,407 | B2 * | 10/2016 | Stutchbury .......... B60K 17/356 |
| 2004/0154844 | A1 * | 8/2004 | Lovato .................... B60G 9/02 |
| | | | 180/41 |
| 2009/0314130 | A1 * | 12/2009 | Dershem ................ E02F 9/006 |
| | | | 403/124 |
| 2010/0307846 | A1 | 12/2010 | Kvist |
| 2012/0317846 | A1 * | 12/2012 | Audet .................... B62D 12/00 |
| | | | 180/9.1 |
| 2014/0044483 | A1 | 2/2014 | Kreutz et al. |
| 2016/0120093 | A1 | 5/2016 | Garton et al. |
| 2018/0354337 | A1 * | 12/2018 | McAdam .................. E02F 9/02 |
| 2019/0084405 | A1 * | 3/2019 | Tamura ............... B60B 27/0021 |

FOREIGN PATENT DOCUMENTS

| | | | |
|---|---|---|---|
| JP | WO2008/004651 | * | 1/2008 |
| WO | 2008004651 A1 | | 1/2008 |
| WO | 2009017533 A1 | | 2/2009 |
| WO | 2013173882 A1 | | 11/2013 |

OTHER PUBLICATIONS

Chinese First Office Action dated Apr. 2, 2021 for Chinese Patent Application No. 201780091659.4, 18 pages (including English translation).

* cited by examiner

ARTICULATED WORKING MACHINE

CROSS REFERENCE TO RELATED APPLICATIONS

This application is a 35 U.S.C. § 371 national stage application of PCT International Application No. PCT/EP2017/064308 filed on Jun. 12, 2017, the entire contents of which are incorporated by reference herein in its entirety.

TECHNICAL FIELD

The invention relates to a working machine comprising a first section and a second section, in which the first and second sections are connected to each other via a joint arrangement, i.e. an articulated working machine.

The invention is applicable on working machines within the fields of industrial construction machines or construction equipment, in particular articulated wheel loaders. Although the invention will be described with respect to an articulated wheel loader, the invention is not restricted to this particular machine, but may also be used in other working machines such as e.g. articulated haulers.

BACKGROUND

A working machine is provided with a bucket, container or other type of implement for lifting, carrying and/or transporting a load. A working machine may be operated with large and heavy loads in areas where there are no roads, for example for transports in connecting with road or tunnel building, sand pits, mines and similar environments.

An example of a working machine is a wheel loader, which usually is provided with a prime mover, such as e.g. an internal combustion engine, a transmission line and a gearbox for supplying momentum or torque to the propulsion means, such as the driving wheels of the wheel loader. Furthermore, a traditional wheel loader comprises a front section with a front frame adapted for supporting the front wheel axle and the front wheels of the wheel loader, and a rear section with a rear frame adapted for supporting the rear wheel axle and the rear wheels of the wheel loader. The front frame is typically arranged to support a lift arrangement with a lifting arm and an implement, as mentioned above.

At least one of the two wheel axles of the wheel loader is typically pivotably attached to the corresponding frame in order to accommodate movement of the working machine over rough terrain, this axle is often referred to as an oscillations axle, or oscillating axle. Typically, the rear wheel axle is an oscillation axle, and the prime mover is adapted for driving the wheels attached to the rear oscillation axle. Owing to the oscillation function of the wheel axle, the drive wheels of the wheel loader can stay in contact with the ground even though large unevenness of the terrain.

However, in such cases where the rear section comprises the drive wheels, propulsion forces needs to be transferred from the drive wheels through the working machine to the front section and the front wheels in order to propel the working machine. Thus, the various parts and portions transporting the propulsion forces from the rear section to the front section needs to be constructed to withstand the stress and fatigue associated with the transfer of the propulsion forces. The high demands put on these part and portions of the working machine is typically associated with high weight and associated costs, and there is a need in the industry for a cost-effective and robust construction transporting the propulsion forces through the working machine.

SUMMARY

In view of the above-mentioned and other drawbacks of the prior art, the object of the present inventive concept is to provide a working machine having a first section with a first frame, a second section with a second frame, and a propulsion force transfer arrangement configured for transferring propulsion forces from said first section to said second section.

According to a first aspect of the invention, the object is achieved by a working machine according to claim 1. More specifically, the invention relates to a working machine comprising:

a first section with a first frame and at least one oscillation axle having two opposing end portions each being equipped with a propulsion hub, said propulsion hubs holding a first pair of ground engaging members;

a second section with a second frame and a second pair of ground engaging members;

a joint arrangement pivotly connecting a joint arrangement frame portion of said first frame to said second frame;

a motor configured for driving at least one ground engaging member of said first pair of ground engaging members in order to create propulsion forces propelling said working machine;

a propulsion force transfer arrangement adapted to transfer propulsion forces from said at least one ground engaging member of the first pair of ground engaging members to the second pair of ground engaging members, via the joint arrangement;

wherein the propulsion force transfer arrangement comprises a connecting element extending centrally in a longitudinal direction of the working machine, for transferring propulsion forces in said first section from said at least one ground engaging member of said first pair of ground engaging members and said oscillation axle, to said joint arrangement frame portion.

By the provision of a working machine comprising a propulsion force transfer arrangement having a connecting element extending centrally in a longitudinal direction of the working machine, propulsion forces may be transferred in the working machine centrally, and thus, the first frame of the first section may be relieved from transferring propulsion forces. Thus, the construction of the first frame may be simpler or be made lighter (i.e. mass reduced), as considerations of propulsion force transfer in the first frame can be disregarded, or at least be reduced, when the propulsion forces are enabled to be transferred centrally in the working machine by the connecting element. Stated differently, the propulsion forces are transferred directly from the oscillation axle to and end portion of the first frame, such as e.g. a front part of the first frame, whereby undesirable force transfer within the first frame is avoided.

It should be understood that all of the propulsion forces need not to be transferred through the connecting element, but some, e.g. a minor part, may be transferred through the first frame of the first section. In other words, the majority of the propulsion forces, such as e.g. more than 50%, or more than 70%, or more than 90%, is transferred via the connecting element. Stated differently, as the connecting element transfer propulsion forces, stresses, such as e.g. tensile and/or shear stresses, in the first frame can be reduced.

According to one embodiment, the at least one motor is configured to generate propulsion forces of said at least one ground engaging members of said first pair of ground engaging members associated with the propulsion axle. In other words, the propulsion forces originate from the at least one ground engaging members of said first pair of ground engaging members associated with the motor, and in the contact between that ground engaging member and the ground. The propulsion forces are then transferred, from said at least one ground engaging member, to the oscillation axle and further, at least mainly, via the connecting element to the joint arrangement frame portion of the first frame, further through the joint arrangement, to the second frame of the second section, and to the second pair of ground engaging members in order to make them rotate.

According to one embodiment, the first section is a rear section of the working machine. Correspondingly, the second section is a front section of the working machine. Hereby, the propulsion forces are transferred from the rear section to the front section, and thus the rear section "pushes" the front section. In other words, the propulsion forces are transferred from the rear section, and said at least one ground engaging member of said first pair of ground engaging members, to the front section to make the second pair of ground engaging members rotate.

According to one alternative embodiment, the first section is a front section of the working machine. Correspondingly, the second section is a rear section of the working machine. Hereby, the propulsion forces are transferred from the front section to the rear section, and thus the front section "pulls" the rear section. In other words, the propulsion forces are transferred from the front section, and said at least one ground engaging member of said first pair of ground engaging members, to the rear section to make the second pair of ground engaging members rotate.

The working machine may be referred to as an articulated working machine as the joint arrangement pivotly connects the first frame of the first section to the second frame of the second section. Thus the first section is pivotly arranged to the second section, and is thus articulated.

According to one embodiment, said motor is configured for driving both ground engaging member of said first pair of ground engaging members. For such embodiments, the motor may e.g. be positioned in between the two ground engaging members of the said first pair of ground engaging members. The motor may e.g. be arranged outside of the oscillation axle, e.g. attached to an outside of the oscillation axle, whereby the oscillation axle is configured as a drive shaft coupled to said propulsion hubs. According to one embodiment, said working machine comprises at least two motors, each one associated with a respective ground engaging member of said first pair of ground engaging members.

It should be noted that the oscillation axle is configured to allow oscillation in order to compensate for road irregularities in such a way that both ground engaging members of said first pair of ground engaging members are in contact with the ground despite the road irregularities. Thus, the ground engaging member(s) of said first pair of ground engaging members propelled by said motor(s), are in contact with the ground and can thus generate the propulsion forces of the working machine.

It should be noted that the ground engaging member(s) driven by the motor(s) may be referred to as propulsion means, such as e.g. the driving wheels.

According to one embodiment, said joint arrangement frame portion is arranged at a longitudinal end of said first frame, and extends along at most 15% of the total length of the first frame.

Hereby, the connecting element can transfer propulsion forces from within the first section (i.e. from the oscillation axle) to an end portion of the first frame, and thus reduce the transferring of propulsion forces via the first frame. Stated differently, the connecting element provides for a propulsion force transfer path centrally of the working machine, at least between the oscillation axle and the end portion of the first frame.

According to one embodiment, said first frame comprises an oscillation axle frame portion arranged between the ground engaging members of said first pair of ground engaging members, and wherein said connecting element extends from said oscillation axle frame portion to said joint arrangement frame portion.

Thus, the connecting element can transfer propulsion forces from said oscillation axle frame portion to said joint arrangement frame portion.

According to one embodiment, the working machine further comprises a pivot pin attached to, and being movable with, said oscillation axle, said pivot pin being configured to rest on a pivot pin resting surface of said first frame in order for said oscillation axle to be movable in the longitudinal direction relative said frame.

In other words, the pivot pin moves with the oscillation axle and propulsion forces in the oscillation axle are directly transferred to the pivot pin. This may e.g. be achieved by that the pivot pin is rigidly connected to, or fixed jointly to, the oscillation axle, and may e.g. be arranged as a protrusion in relation to the oscillation axle.

By allowing the oscillation axle, and the thus the pivot pin, to be movable relative the first frame, at least along the longitudinal direction of the working machine, by providing the pivot pin to rest on the pivot pin resting surface of the first frame, propulsion forces are less prone to be transferred in the main structure of the first frame, and is instead transferred from the oscillation axle to the joint arrangement frame portion, via the connecting element. The main structure of the first frame may e.g. include all the frame portions of the first frame except the joint arrangement frame portion (i.e. one of the end portions of the first frame). Thus, the pivot pin is in contact with the first frame, via said pivot pin resting surface of the first frame, but is not able to transfer propulsion forces (except for transferred frictional forces described below) from the oscillation axle to the oscillation axle frame portion of the first frame, and thus not to transfer propulsion forces to the main structure of the first frame. Naturally, at least some propulsion forces are transferred from the pivot pin to the oscillation axle frame portion of the first frame via the pivot pin resting surface as a result of friction forces originating from the sliding contact between the pivot pin and the pivot pin resting surface. However, such contribution to the propulsion force transfer is of less importance, or is at least lower compared to the propulsion force transfer via the connecting element.

It should also be noted that the pivot pin enables a pivoting movement of the oscillation axle about the pivot pin (i.e. pivoting in a direction perpendicular to the longitudinal direction of the working machine) in order to enable the oscillation axle to oscillate and to take up ground irregularities. However, and according to at least one example embodiment, the pivot pin is not movable relative the first frame in the transversal or vertical directions. Thus, the oscillation axle is able to take up side forces and vertical forces from the working machine via the main structure of the first frame, the oscillation axle, and to the first pair of ground engaging members to the ground. For example, the pivot pin may be held in lugs or loops of the first frame.

According to one embodiment, the first frame comprises at least one stop lug arranged to limit the longitudinal movement of the pivot pin relative the first frame. Hereby, the pivot pin may be limited in its longitudinal movement, and may thus only depart a predetermined distance from its location within the first section.

According to one embodiment, said pivot pin is comprised in said propulsion force transfer arrangement, and is arranged at least partly between said oscillation axle and said connecting element for transporting propulsion forces from said oscillation axle to said connecting element.

In other words, the pivot pin may be connected to, e.g. directly attached to, the connecting element. Hereby, the connecting element is movable, at least in the longitudinal direction, with the pivot pin. Thus, as the pivot pin moves in the longitudinal direction with the oscillation axle, and as the pivot pin moves in the longitudinal direction with the connecting element, propulsion forces are enable to be transferred from the oscillation axle to the connecting element via the pivot pin.

According to one embodiment, the connecting element is pivotly attached to the pivot pin. Thus, the connecting element may be angled compared to the pivot pin along the longitudinal direction of the working machine. Hereby, the pivot pin may be moved in the longitudinal direction relative to the first frame, while still being coupled to the joint arrangement frame portion of the first frame, via the connecting element. According to one embodiment, the connecting element is pivotly attached to the joint arrangement frame portion of the first frame.

According to one embodiment, said pivot pin is, at least in a force transfer sequence, or force transfer aspect, arranged at least partly between said oscillation axle and said connecting element. According to one embodiment, said pivot pin is physically arranged at least partly between said oscillation axle and said connecting element.

According to one embodiment, said oscillation axle comprises an elongated main body comprising a first end portion, a second end portion, and a center portion arranged between said first and second end portions, and wherein said pivot pin is connected to said center portion of said elongated main body.

Hereby, a relatively simple solution to enabling propulsion forces to be transferred centrally of the working machine is provided. According to one embodiment, the pivot pin is arranged in a horizontal plane above the center portion of the elongated main body, and is connected to the elongated main body by connecting portion. The pivot pin may thus be arranged as a protrusion extending from a top surface of the elongated main body.

According to one alternative embodiment, the pivot pin is integrated in the center portion of the elongated main body. In such embodiments, the pivot pin is arranged in the same horizontal plane as the elongated main body.

According to one embodiment, said center portion is centrally arranged on said elongated main body, and is delimited to be at most 50% of the main body length.

It should be noted that the main body length typically extends perpendicular to the longitudinal direction of the working machine. That is the main body length extends along the width of the working machine. Thus, the propulsion forces from the oscillation axle to the connecting element via the pivot pin, is transferred centrally, i.e. within the central 50% of the width of the working machine.

According to one embodiment, said connecting element is a beam.

Hereby, a simple by yet effective construction for transferring propulsion forces centrally within the working machine is provided. Furthermore, a beam, which typically has a longitudinal extension may easily be connected to other parts of the working machine at its end portions, e.g. to the pivot pin, and the joint arrangement frame portion of the first frame. According to one embodiment, said connecting element is a solid element. However, according to one embodiment, said connecting element is a pipe or tube or the like.

According to one embodiment said connecting element is not a shaft configured for transferring rotational motion, thus, said connecting element may be a rotational free connecting element, or a non-rotating connecting element. It should be noted that rotational free here means that the connecting element cannot rotate one revelation about its axis. This may e.g. be achieved by rotational free connections of the connecting element to the pivot pin and the first frame (i.e. the joint arrangement frame portion), respectively.

According to one embodiment, said connecting element is a first connecting element, and said force transfer arrangement comprises a second connecting element. Said second connecting element may in structure and function be similar or identical with said first connecting element.

According to one embodiment, said second section comprises at least a fixed axle having two opposing end portions each being equipped with a propulsion hub, said propulsion hubs holding said second pair of ground engaging members, and wherein said oscillation axle and said fixed axle are mechanically independent of each other.

By having the oscillation axle and the fixed axle mechanically independent of each other, one of the axles, here the oscillation axle, can hold the propulsion means, wherein generated propulsion forces may be transferred through the working machine via the connecting element and the force transfer arrangement, to the fixed axle. According to one embodiment, the first pair of ground engaging members and the second pair of ground engaging members are driven by mechanically independent propulsion systems.

According to one embodiment, said motor is an electric motor.

An electric motor typically requires less peripheral equipment compared to an internal combustion engine, and may more easily be adapted in size. Thus, the electric motor may be positioned relatively close to the associated ground engaging member(s) and thus, the number of drive shafts, e.g. cardan shaft, for transferring momentum or torque to the ground engaging member can be reduced or even omitted. This may e.g. free up space within the working machine, which can be used for other purposes, e.g. the above mentioned connecting element. In other words, using an electric motor facilitates placement of the motor closer to the motor driven ground engaging member(s), whereby space centrally within the working machine, e.g. centrally within the first section of the working machine, can be used for transferring propulsion forces via the connecting element.

According to one embodiment, said motor is arranged in one of said propulsion hubs of said oscillation axle.

Thus, the motor is positioned close to the ground engaging member which it propels, and the peripheral equipment for transferring momentum or torque from the motor to the associated ground engaging member can be kept to a minimum, and at least be posited away from the central parts of the working machine, such as e.g. central parts of the first section, such as e.g. the space between the oscillation axle frame portion and the joint arrangement frame portion of the first frame.

According to one embodiment, said working machine comprises at least one battery for storing energy, which battery is electrically connected to the motor(s).

According to one embodiment, said motor is a first motor and the working machine comprises at least a second motor configured for driving at least the other one of the ground engaging member of said first pair of ground engaging members in order to contribute in creation of propulsion forces propelling said working machine. In other words, the working machine comprises at least two motors, wherein each motor is associated with a respective ground engaging member of said first pair of ground engaging members. Thus, the propulsion force transfer arrangement is adapted to transfer propulsion forces from the first pair of ground engaging members to the second pair of ground engaging members (in order to make them rotate), via the joint arrangement. Thus, both of the ground engaging members are driven by a respective motor, and thus the first pair of ground engaging members are driven by motors.

Said second motor may be arranged in the other of said propulsion hubs of said oscillation axle as compared to said first motor.

According to one embodiment, said oscillation axle is comprised in said propulsion force transfer arrangement.

In other words, propulsion forces created by the ground engaging member(s) of said first pair of ground engaging members, are at least transferred in the working machine via said oscillation axle.

According to one embodiment, said joint arrangement is comprised in said propulsion force transfer arrangement.

Correspondingly, the propulsion forces are at least transferred in the working machine via said joint arrangement.

According to one embodiment, the pivot pin, parts of the second frame, and/or the fixed axle is/are comprised in said propulsion force transfer arrangement, and thus contribute to transfer propulsion forces in the working machine.

According to one embodiment, the working machine is a wheel loader. According to one embodiment, the working machine is an articulated working machine, such as e.g. an articulated wheel loader.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
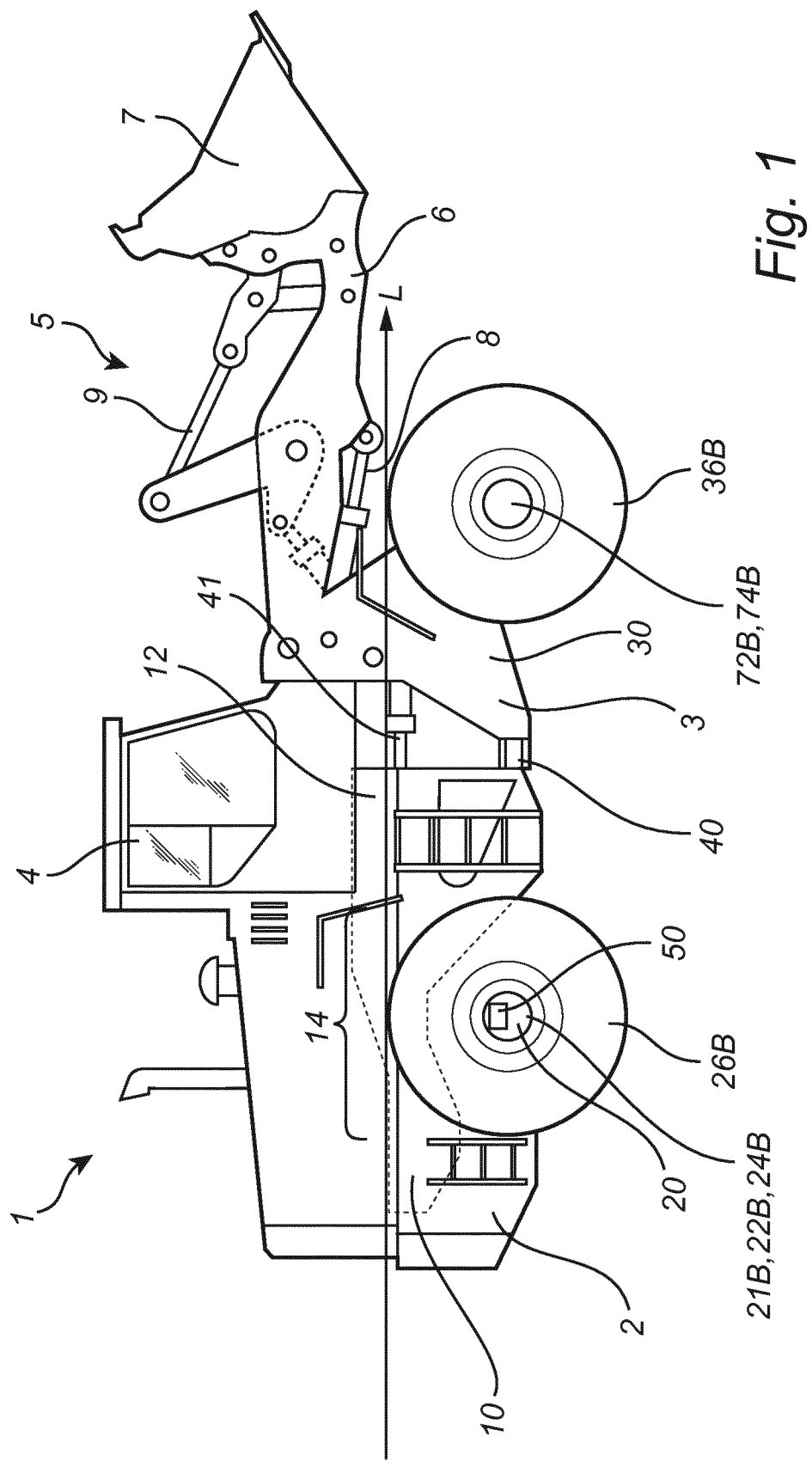
FIG. 1 is a side view of a working machine in the form of a wheel loader according to an example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a working machine 1 according to the present invention. The working machine 1 depicted in FIG. 1 is a wheel loader 1 for which the inventive concept which will be described in detail below, is particularly suitable for. In FIG. 1, the right hand side of the wheel loader 1 is shown, as viewed along the longitudinal axis L in the direction of the arrow.

The wheel loader 1 comprises a first section 2, in FIG. 1 being a rear section 2, having a first frame 10, and a second section 3, in FIG. 1 being a front section 3, having a second frame 30. The first section 2 comprises an oscillation axle 20 having two opposing end portions 22A, 22B, i.e. a first end portion 22A and a second end portion 22B (of which only the second end portion 22B is shown in FIG. 1), each being equipped with a propulsion hub 24A, 24B, i.e. a first propulsion hub 24A and a second propulsion hub 24B, respectively (of which only the second propulsion hub 24B is shown in FIG. 1) holding a first pair of ground engaging members 26A, 26B in the form of a first pair of wheels 26A, 26B, i.e. a first wheel 26A and a second wheel 26B (of which only the second wheel 26B is shown in FIG. 1). Correspondingly, the second section 3 comprises a fixed axle 70 having two opposing end portions 72A, 72B, i.e. a first end portion 72A and a second end portion 72B (of which only the second end portion 72B is shown in FIG. 1), each being equipped with a propulsion hub 74A, 74B, i.e. a first propulsion hub 74A and a second propulsion hub 74B, respectively (of which only the second propulsion hub 74B is shown in FIG. 1) holding a second pair of ground engaging members 36A, 36B in the form of a second pair of wheels 36A, 36B, i.e. a first wheel 36A and a second wheel 36B (of which only the second wheel 36B is shown in FIG. 1). The oscillation axle 20 and the fixed axle 70 are mechanically independent of each other.

The first section 2 comprises a cab 4 in which e.g. a driver of the wheel loader 1 may be located. However, it should be noted that the wheel loader 1 may be a driver-less working machine, and that the cab 4 may be dispensed with. In FIG. 1, the second section 3 is connected to an equipment 5 for handling objects or material, comprising a load-arm unit 6 and a bucket 7. The load-arm unit 6 is at a first end pivotably connected to the second section 3 of the wheel loader 1, and at a second end pivotably connected to the bucket 7. The load-arm unit 6 can be raised and lowered relative the second section 3 by means of a raising/lowering actuator 8, here embodied as a hydraulic cylinder 8 (it should be noted that more than one actuator may be used for this purpose, but only one raising/lowering actuator 8 is shown in FIG. 1). The raising/lowering actuator 8 is connected at one end to the second section 3, and at the other end to the load-arm unit 6. The bucket 7 can be tilted relative to the load-arm unit 6 by means of a tilting actuator 9, here embodied as a hydraulic cylinder 9, which is connected at one end to the second section 3, and at the other end to the bucket 7 via a link-arm system.

The wheel loader 1 of FIG. 1 further comprises a joint arrangement 40 which pivotly connects the first frame 10 to the second frame 30. Hence, the first section 2 and the second section 3 are connected to each other in such a way that they can pivot in relation to each other around a vertical axis. In other words, the wheel loader in FIG. 1 is articulated. The pivoting motion between the first section 2 and the second section 3 may e.g. be actuated by two pivoting actuators, of which only one is shown in FIG. 1 and being embodied as a hydraulic cylinder 41.

Figure 4:
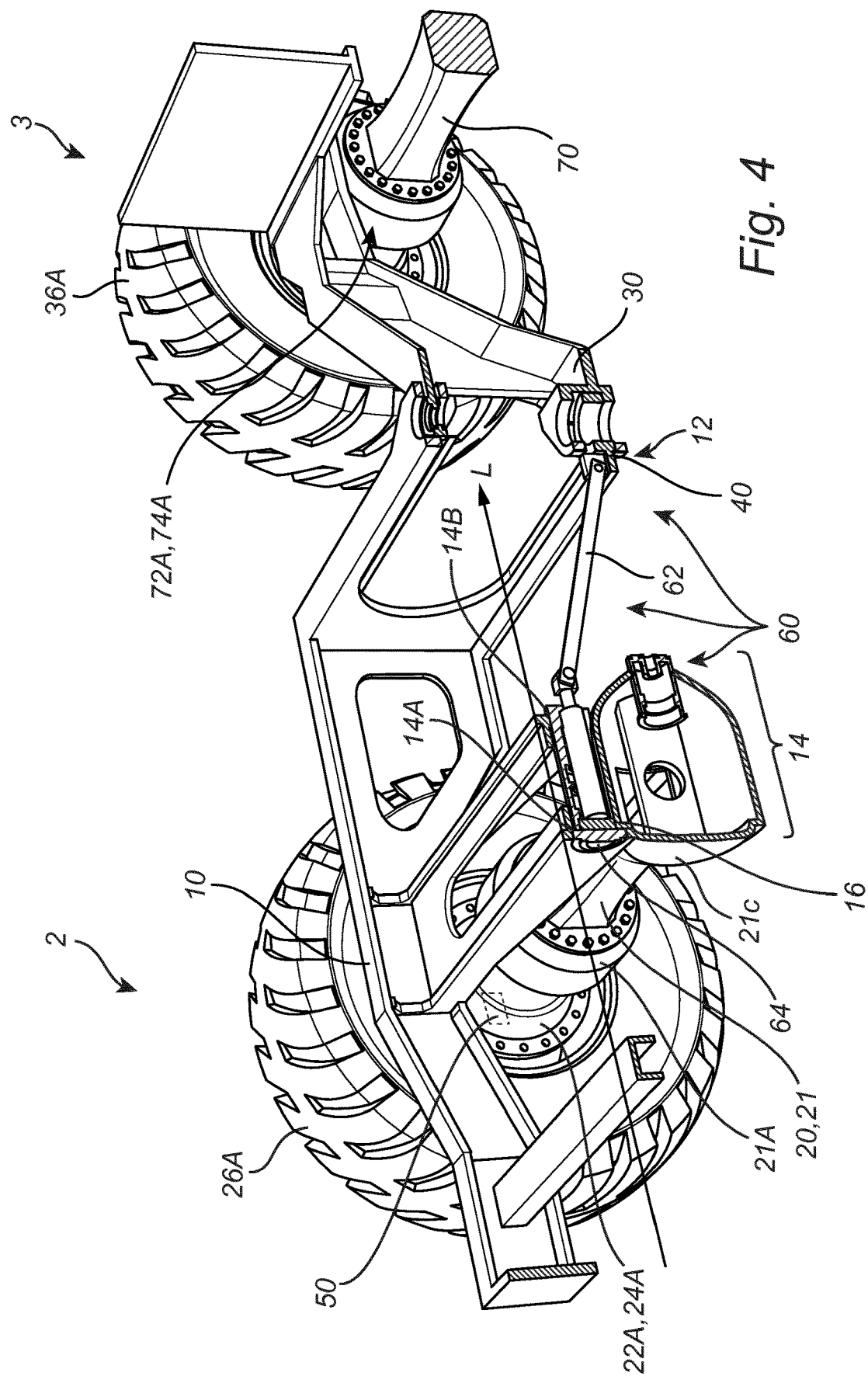
FIG. 4 shows parts of the working machine in a perspective view in accordance with an example embodiment of the present invention.

A first motor 50, such as e.g. an electric motor 50, is in FIG. 1 integrated with the second propulsion hub 24B of the oscillation axle 20. The first motor 50 is configured for driving at least the second wheel 26B of the first pair of wheels, associated with the second propulsion hub 24B, in order to create propulsion forces propelling the wheel loader 1. It should be noted that each of the two propulsion hubs 24A, 24B of the oscillation axle 20 may be equipped with an individual motor, hence the first motor 50 is integrated with the second propulsion hub 24B, and a second motor 50' is integrated with the first propulsion hub 24A (as shown in FIG. 4). Alternatively, the oscillation axle 20 may be commonly driven by a motor which is directly, or indirectly, coupled to the two propulsion hubs 24A, 24B of the oscillation axle 20. Such motor may e.g. be located on an opposite side of the oscillation axle 20, as compared to the fixed axle 70 of the second section 3.

According to one embodiment, the working machine 1 comprises an internal combustion engine, ICE. Thus, the working machine 1 may be a hybrid vehicle having an ICE and one or more electric motors 50. The ICE may furthermore drive a generator in order to generate the electricity needed for the one or more electric motors 50. Moreover, the ICE may, in at least some operation modes, drive the second pair of ground engaging members 36A, 36B such that all ground engaging members 26A, 26B, 36A, 36B are propelling the working machine 1 (e.g. an all wheel drive mode used in tough or slippery terrain).

According to one embodiment, at least one of ground engaging members of the second pair of ground engaging members 36A, 36B is driven by an associated electric motor, e.g. arranged in the corresponding propulsion hub 74A, 74B. Thus, the working machine 1 may change operation mode from "first section drive mode" in which at least one of the ground engaging members of the first pair of ground engaging members 26A, 26B are propelling the working machine 1, to a "second section drive mode" in which at least one of the ground engaging members of the second pair of ground engaging members 36A, 36B are propelling the working machine 1. Moreover, the working machine may operated in an "all ground engaging member drive mode" in which both the first pair and the second pair of ground engaging members 26A, 26B, 36A, 36B propel the working machine 1.

Figure 2:
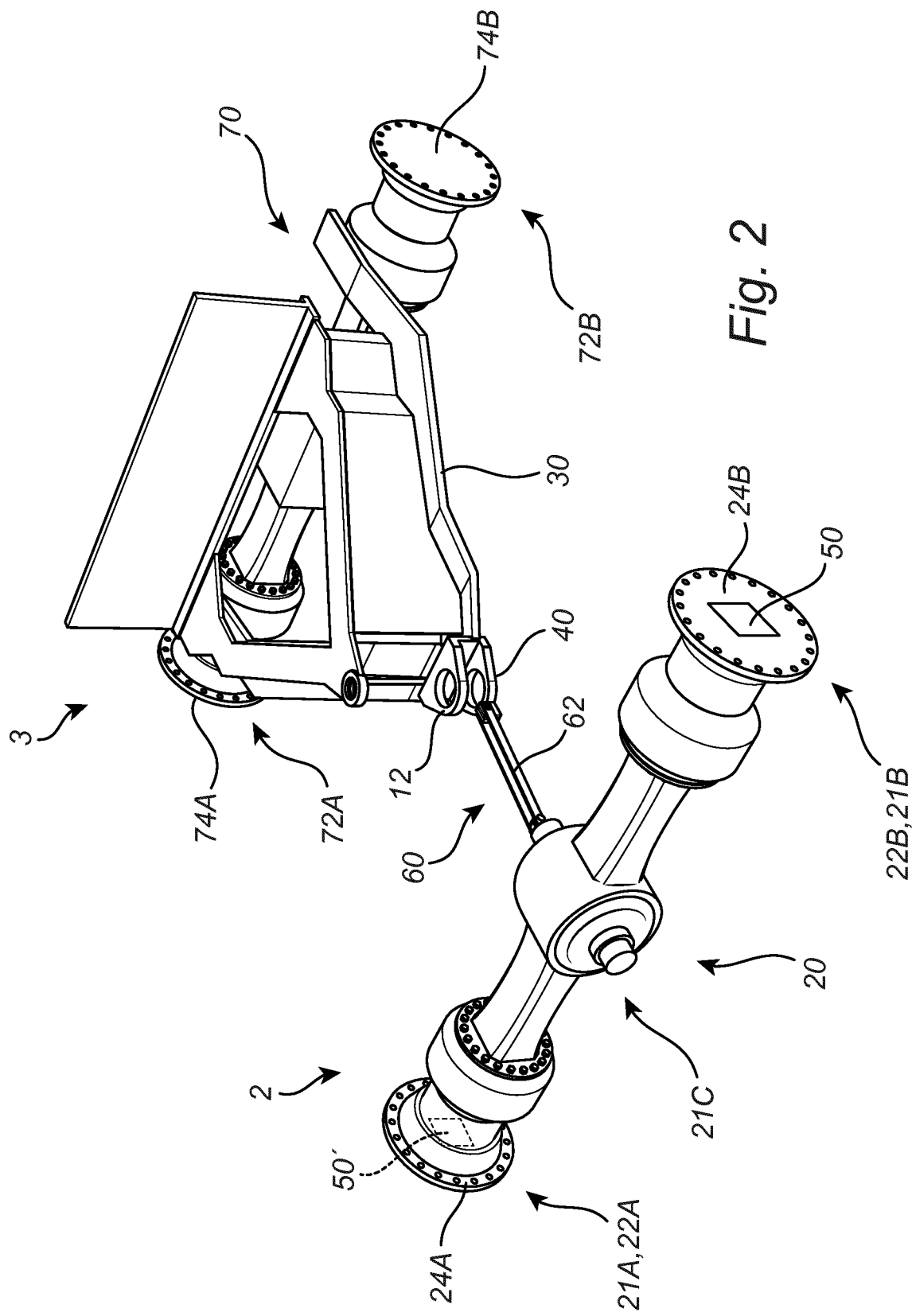
FIG. 2 shows parts of the working machine in FIG. 1 in a perspective view in accordance with an example embodiment of the present invention.

Turning to FIG. 2 showing parts of the working machine 1 in FIG. 1. In more detail, FIG. 2 shows the oscillation axle 20 of the first section 2, the fixed axle 70 and parts of the second frame 30 of the second section 3, and the joint arrangement 40. In FIG. 2, the oscillation axle 20 and its two opposing end portions 22A, 22B, i.e. a first end portion 22A and a second end portion 22B, are shown. The first end portion 22A is equipped with a first propulsion hub 24A, and the second end portion 22B is equipped with a second propulsion hub 24B, the propulsion hubs 24A, 24B is configured for holding a first pair of ground engaging members (not shown here for increased clarity). Correspondingly, the fixed axle 70 has two opposing end portions 72A, 72B, i.e. a first end portion 72A and a second end portion 72B, each being equipped with a propulsion hub 74A, 74B, i.e. a first propulsion hub 74A and a second propulsion hub 74B, respectively, configured for holding a second pair of ground engaging members (not shown here for increased clarity) The oscillation axle 20 and the fixed axle 70 are mechanically independent of each other. Moreover, as shown in FIG. 2, the joint arrangement 40 connects a portion of the first frame, that is a joint arrangement frame portion 12, with the second frame 30. The joint arrangement frame portion 12 is arranged at a longitudinal end portion 12 of the first frame, and extends along at most 15% of the total length of the first frame 10.

Moreover, in FIG. 2, a propulsion force transfer arrangement 60 is shown. Parts of the force transfer arrangement 60 in FIG. 2 is also shown in an enlarged view in FIG. 3. Thus, the force transfer arrangement 60 will now be described with reference to both FIG. 2 and FIG. 3. The propulsion force transfer arrangement is configured to transfer propulsion forces from the first pair ground engaging members 26A, 26B, each being driven by a respective motor 50, 50' to the second pair ground engaging members 36A, 36B, via the joint arrangement 40. The propulsion force transfer arrangement 60 comprises a connecting element 62, here embodied as a beam 62, extending centrally of the wheel loader 1, in the longitudinal direction L, and is configured to transfer propulsion forces in said first section 2 from the first pair of wheels 26A, 26B and the oscillation axle 20, to the joint arrangement frame portion 12. In more detail, the first frame 10 comprises an oscillation axle frame portion 14 arranged between the first and second wheels 26A, 26B, and wherein the connecting element 62 extends from the oscillation axle frame portion 14 to the joint arrangement frame portion 12. In other words, the connecting element 62 extends from a position within the first section 2, in close proximity to the oscillation axle 20, i.e. from the oscillation axle frame portion 14, to an longitudinal end portion 12, or joint arrangement frame portion 12, of the first frame 10. From the joint arrangement frame portion 12, the propulsion forces is further transferred to the second section 3, and the second frame 30 via the joint arrangement 40, and further to the fixed axle 70 and the second pair of wheels 36A, 36B, whereby all wheels 26A, 26B, 36A, 36B rotates.

Figure 3:
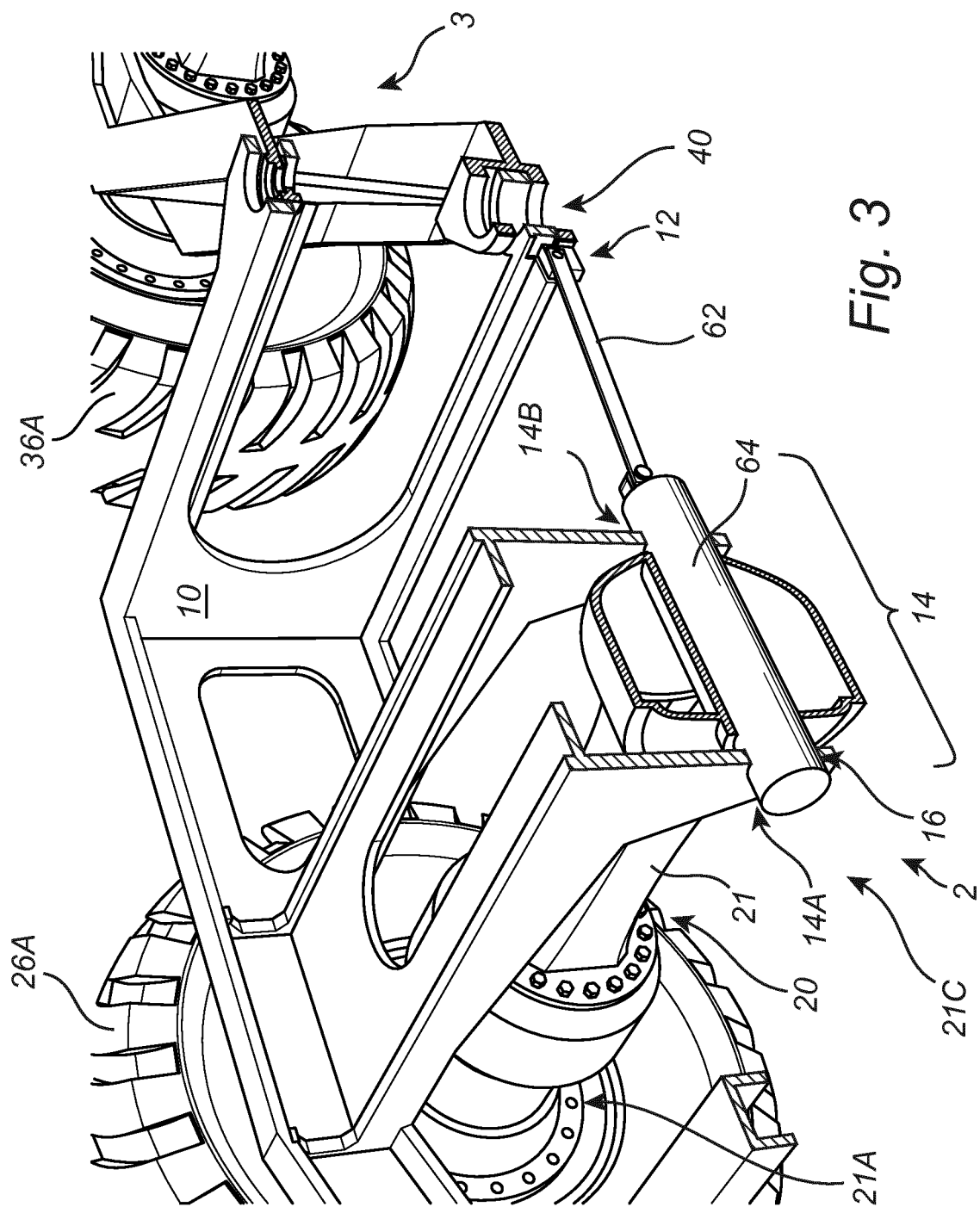
FIG. 3 shows an enlarge view of details the working machine in FIG. 2 in a perspective view in accordance with an example embodiment of the present invention.

As seen in FIG. 3, the connecting element 62 is mechanically coupled to a pivot pin 64. The pivot pin 64 is attached to, and is movable with, the oscillation axle 20. For example, the pivot pin 64 is rigidly connected to the oscillation axle 20, and as shown in FIG. 3, is integrated into the oscillation axle 20. Stated differently, in the embodiment shown in FIG. 3, the pivot pin 64 is arranged in geometrical horizontal plane coinciding with the oscillation axle 20. Thus, the oscillation axle 20 is able to move relative the first frame 10, at least in the longitudinal direction of the wheel loader 1. This is achieved by that the pivot pin 64 is configured to rest on a pivot pin resting surface 16 of the first frame 10. In more detail, the pivot pin 64 is held in two lugs 14A, 14B arranged in the oscillation axle frame portion 14, and thus the pivot pin resting surface 16 of the first frame 10 is comprised in the two lugs 14A, 14B.

The pivot pin 64 is thus comprised in the propulsion force transfer arrangement 60, as it takes part of the transfer of propulsion force from the first pair of wheels 26A, 26B to the second pair of wheels 36A, 36B. As seen in FIG. 3, the pivot pin 64 is arranged at least partly between the oscillation axle 20 and the connecting element 62, thus enabling transportation of propulsion forces from the oscillation axle 20 to the connecting element 62. The connecting element 62 may be pivotly attached to the pivot pin 64 and the joint arrangement frame portion 12, respectively.

Moreover, as shown in the embodiment of FIG. 3, the joint arrangement 40 is comprised in the propulsion force transfer arrangement 60 as it takes part of the transfer of propulsion force from the first pair of wheels 26A, 26B to the second pair of wheels 36A, 36B. Correspondingly, the oscillation axle 20 is comprised in the propulsion force transfer arrangement 60, and the fixed axle 70 is comprised in the propulsion force transfer arrangement 60.

In an even more detailed description, the oscillation axle 20 comprises an elongated main body 21 comprising a first end portion 21A, a second end portion 21B (shown in FIG. 1 and FIG. 2), and a center portion 21C arranged between the first and second end portions, 21A, 21B. As seen in FIG. 3, the center portion 21C is centrally arranged on the elongated main body 21, and comprises at least a part of the pivot pin 64.

Turning to FIG. 4 showing an alternative arrangement of the oscillation axle 20 and the connecting pin 64 as compared to FIG. 2 and FIG. 3. More specifically, in FIG. 4, the connecting pin 64 is connected to the top side of the oscillation axle 20. Otherwise, the arrangement in FIG. 4 is in large identical to the arrangement in FIG. 2 and FIG. 3 why the same reference numerals are used for corresponding features.

In more detail, FIG. 4 shows parts in the left hand half of the working machine 1 as viewed along the longitudinal axis L in the direction of the arrow (i.e. in a direction from the first section 2 to the second section 3). Thus, in FIG. 4, for the oscillation axle 20, the first end portion 22A equipped with the first propulsion hub 24A holding the first wheel 26A of the first pair of wheels are shown. Correspondingly, for the fixed axle 70, the first end portion 72A equipped with the first propulsion hub 74A holding the first wheel 36A of the second pair of wheels are shown. Moreover, as shown in FIG. 4, the joint arrangement 40 connects a portion of the first frame 10, that is a joint arrangement frame portion 12, with the second frame 30. The joint arrangement frame portion 12 is arranged at a longitudinal end portion 12 of the first frame 10, and extends along at most 15% of the total length of the first frame 10. In FIG. 4, the length of the joint arrangement frame portion 12 is less than 10% of the total length of the first frame 10.

As seen in FIG. 4, the connecting element 62 is mechanically coupled to a pivot pin 64. The pivot pin 64 is attached to the upper side of the oscillation axle 20, and is movable with the oscillation axle 20. In other words, in FIG. 4, the pivot pin 64 is arrange in a geometrical horizontal plane above the oscillation axle 20. In FIG. 4, the pivot pin 64 is rigidly connected to the oscillation axle 20 and thus, the oscillation axle 20 is able to move relative the first frame 10, at least in the longitudinal direction of the wheel loader 1. This is achieved by that the pivot pin 64 is configured to rest on a pivot pin resting surface 16 of the first frame 10. In more detail, the pivot pin 64 is held in two lugs 14A, 14B arranged in the oscillation axle frame portion 14, and thus the pivot pin resting surface 16 of the first frame 10 is comprised in the two lugs 14A, 14B. As for the embodiment shown in FIG. 2 and FIG. 3, the connecting element 62 in FIG. 4 may be pivotly attached to the pivot pin 64 and the joint arrangement frame portion 12, respectively.

The pivot pin 64 is thus comprised in the propulsion force transfer arrangement 60, as it takes part of the transfer of propulsion force from the first pair of wheels 26A, 26B to the second pair of wheels 36A, 36B. As seen in FIG. 4, the pivot pin 64 is, in a force transfer aspect, arranged at least partly between the oscillation axle 20 and the connecting element 62, thus enabling transportation of propulsion forces from the oscillation axle 20 to the connecting element 62.

Moreover, as shown in the embodiment of FIG. 4, the joint arrangement 40 is comprised in the propulsion force transfer arrangement 60 as it takes part of the transfer of propulsion force from the first pair of wheels 26A, 26B to the second pair of wheels 36A, 36B.

Correspondingly, the oscillation axle 20 is comprised in the propulsion force transfer arrangement 60, and the fixed axle 70 is comprised in the propulsion force transfer arrangement 60.

In an even more detailed description, the oscillation axle 20 comprises an elongated main body 21 comprising a first end portion 21A, a second end portion 21B (shown in FIG. 1), and a center portion 21C arranged between the first and second end portions, 21A, 21B. As seen in FIG. 4, the center portion 21C is centrally arranged on the elongated main body 21, and comprises the rigid connection to the pivot pin 64. Moreover, the pivot pin 64 is arranged in a geometrical horizontal plane above the center portion 21C. The pivot pin is also rigidly connected to the center portion 21C of the elongated main body 21 of the oscillation axle 20.

It is to be understood that the present invention is not limited to the embodiments described above and illustrated in the drawings; rather, the skilled person will recognize that many changes and modifications may be made within the scope of the appended claims.

The invention claimed is:

1. A working machine comprising:
   a first section with a first frame and at least one oscillation axle having two opposing end portions each being equipped with a propulsion hub, the propulsion hubs holding a first pair of ground engaging members;
   a second section with a second frame and a second pair of ground engaging members;
   a joint arrangement pivotly connecting a joint arrangement frame portion of the first frame to the second frame;
   a motor configured for driving at least one ground engaging member of the first pair of ground engaging members in order to create propulsion forces propelling the working machine;
   a propulsion force transfer arrangement adapted to transfer propulsion forces from the at least one ground engaging member of the first pair of ground engaging members to the second pair of ground engaging members, via the joint arrangement;
   wherein the propulsion force transfer arrangement comprises a connecting element extending centrally in a longitudinal direction (L) of the working machine, for transferring propulsion forces in the first section from the at least one ground engaging member of the first pair of ground engaging members and the oscillation axle, to the joint arrangement frame portion.

2. The working machine according to claim 1, wherein the joint arrangement frame portion is arranged at a longitudinal end of the first frame, and extends along at most 15% of the total length of the first frame.

3. The working machine according to claim 1, wherein the first frame comprises an oscillation axle frame portion arranged between the ground engaging members of the first pair of ground engaging members, and wherein the connecting element extends from the oscillation axle frame portion to the joint arrangement frame portion.

4. The working machine according to claim 1, further comprising a pivot pin attached to, and being movable with, the oscillation axle, the pivot pin being configured to rest on a pivot pin resting surface of the first frame in order for the oscillation axle to be movable in the longitudinal direction relative the frame.

5. The working machine according to claim 4, wherein the pivot pin is comprised in the propulsion force transfer arrangement, and is arranged at least partly between the oscillation axle and the connecting element for transporting propulsion forces from the oscillation axle to the connecting element.

6. The working machine according to claim 5, wherein the oscillation axle comprises an elongated main body comprising a first end portion, a second end portion, and a center portion arranged between the first and second end portions, and wherein the pivot pin is connected to the center portion of the elongated main body.

7. The working machine according to claim 6, wherein the center portion is centrally arranged on the elongated main body, and is delimited to be at most 50% of the main body length.

8. The working machine according to claim 1, wherein the connecting element is a beam.

9. The working machine according to claim 1, wherein the second section comprises at least a fixed axle having two opposing end portions each being equipped with a propulsion hub, the propulsion hubs holding the second pair of ground engaging members, and wherein the oscillation axle and the fixed axle are mechanically independent of each other.

10. The working machine according to claim 1, wherein the motor is an electric motor.

11. The working machine according to claim 1, wherein the motor is arranged in one of the propulsion hubs of the oscillation axle.

12. The working machine according to claim 11, wherein the motor is a first motor, and the working machine comprises a second motor, and wherein the second motor is arranged in another of the propulsion hubs of the oscillation axle as compared to the first motor.

13. The working machine according to claim 1, wherein the oscillation axle is comprised in the propulsion force transfer arrangement.

14. The working machine according to claim 1, wherein the joint arrangement is comprised in the propulsion force transfer arrangement.

15. The working machine according to claim 1, wherein the working machine is a wheel loader.

* * * * *